(No Model.)
C. DOUGHMAN.
HORSE POWER POST HOLE BORER.
No. 579,923. Patented Mar. 30, 1897.
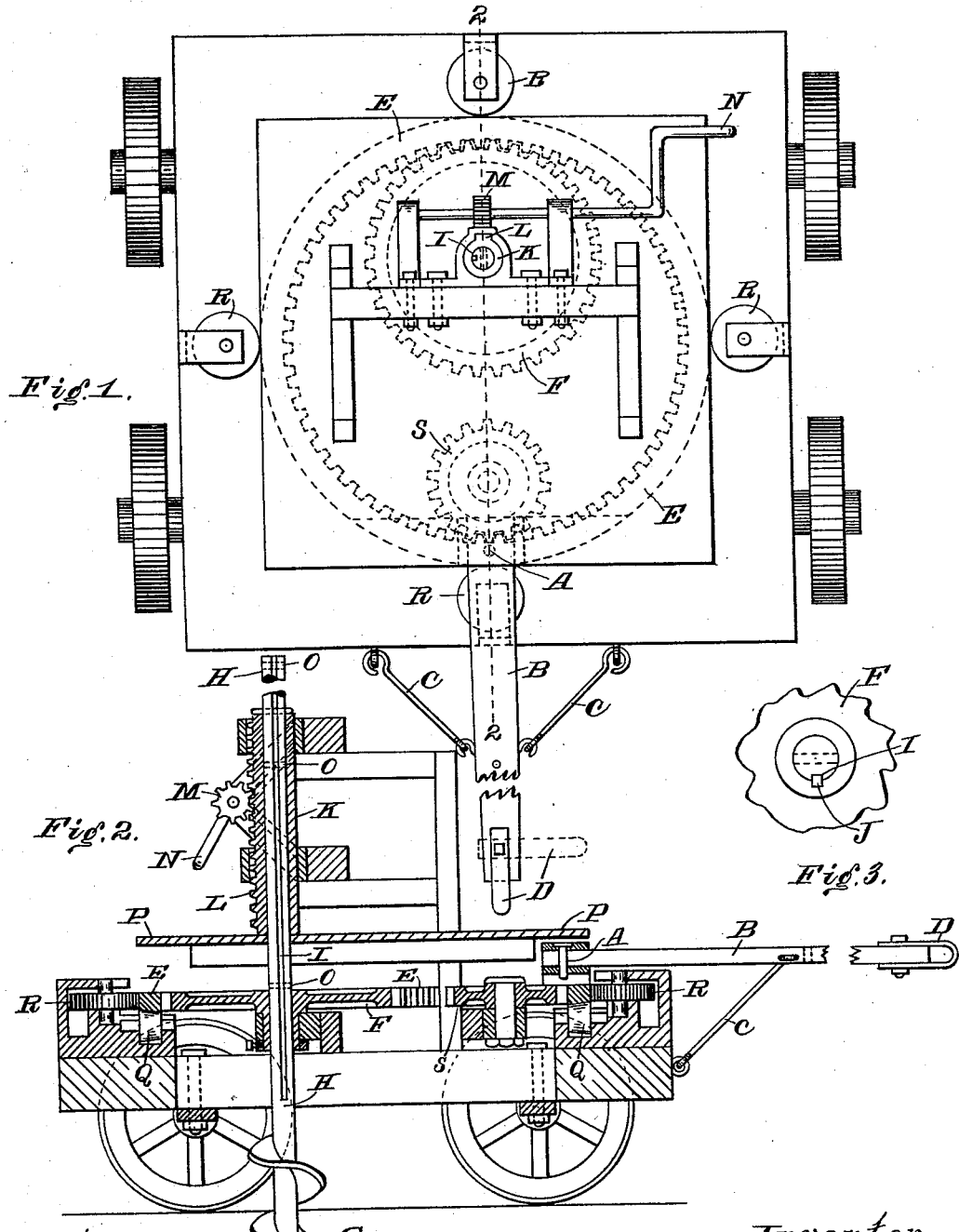
Witnesses
Don A. Phelps
W. H. Michell
Inventor
Charles Doughman
by J. Q. Lemon
Attorney

United States Patent Office.

CHARLES DOUGHMAN, OF PLEASANT PLAIN, OHIO.

HORSE-POWER POST-HOLE BORER.

SPECIFICATION forming part of Letters Patent No. 579,923, dated March 30, 1897.

Application filed December 7, 1896. Serial No. 614,842. (No model.)

*To all whom it may concern:*

Be it known that I, CHARLES DOUGHMAN, a citizen of the United States, residing at Pleasant Plain, in the county of Warren and State of Ohio, have invented certain new and useful Improvements in Horse-Power Post-Hole Borers, of which the following is a specification, reference being had to the accompanying drawings, forming part of this specification.

In the accompanying drawings, Figure 1 is a plan view of the horse-power post-hole borer. Fig. 2 is a section on line 2 2 of Fig. 1. Fig. 3 is a plan view of gear and shank of auger, showing how the key in gear fits in keyway of auger-shank.

Similar letters refer to similar parts throughout the several views.

The horse-power post-hole borer operates as follows: The pin A is removed from the tongue B. The tongue is then pushed back, which allows the stay-rods C to be unhooked from the tongue. When the tongue is pulled back to its former position and the pin A replaced, the clevis D is so arranged that it can be turned to one side and a horse hitched to it. The tongue is attached to the gear E. When the horse is hitched to the tongue with clevis turned to one side, the horse can travel around the machine, thereby revolving the gear E. The gear E meshes with another gear F, which revolves as E revolves. The revolving of the gear E imparts a rotary motion to the auger G through the shank H. The shank H has a keyway I cut throughout its length, which slides on a key J, fastened to the gear F. By this construction I can impart a rotary motion to the auger, and at the same time slide the shank H up and down through the gear F. The shank H passes through a sleeve K. The sleeve K has a projection on one of its outer sides, in which is cut a rack L. This rack meshes with a pinion M, which is revolved by means of a crank N. By turning the crank N the pinion M is caused to revolve, which imparts an up-and-down motion to the sleeve K through the rack L. In the shank H are a series of holes O. When a hole has been bored to the proper depth and it is desirable to raise the auger, it can be done in the following manner: The sleeve K is lowered and a pin placed in one of the holes O. Then the sleeve K is raised by means of the crank N and pinion M. When it is at the proper height, another pin is placed in one of the holes O, which come above the platform P, which holds the auger in that position, so that the sleeve K can be lowered and a pin placed in a lower hole in the shank, so that it can be raised still higher, if desirable. To facilitate the revolving of the gear E, cone-shaped wheels Q are placed under the gear E at proper intervals. To hold the gear E in position when revolving and prevent any lateral movement, the wheels R are placed against the periphery of the gear E. Also the gear S is used to assist in holding the gear E in position. When the stay-rods C are hooked onto the tongue B, it will not permit the tongue to be revolved around the machine, and when they are in use the tongue is used for the purpose of pulling the machine forward to any desired position.

What I claim as my invention, and desire to secure by Letters Patent, is—

The combination in a horse-power post-hole borer, of a tongue, B, attached to the frame of the machine by the stay-rods, C, the tongue, B, also attached to the gear, E, by means of the pin, A, for revolving the same, the gear, E, revolving on cone-shaped wheels, Q, and held in position by straight-faced wheels, R, the gear, E, also meshing with gears F and S, the gear F, having shank, H, passing up and down through gear, F, and compelled to revolve with the gear, F, through the agency of the key, J, the shank, H, imparting a rotary motion to the auger, G, the sleeve, K, around the shank, H, the rack, L, on the outer surface of the sleeve, K, the gear, M, meshing with the rack, L, for the purpose of raising and lowering the sleeve, K, the gear, M, being turned by the crank, N, the shank, H, having holes, O, at regular intervals for receiving a pin to support the shank in any desired position, all substantially as set forth.

CHARLES DOUGHMAN.

Witnesses:
   J. F. EVANS,
   GEORGE JOSLIN.